(12) United States Patent
Lindroos

(10) Patent No.: US 6,748,973 B2
(45) Date of Patent: Jun. 15, 2004

(54) VALVE MEANS

(75) Inventor: Gunnar Lindroos, Helsinki (FI)

(73) Assignee: Evac International Oy, Helsinki (FI)

( * ) Notice: Subject to any disclaimer, the term of this patent is extended or adjusted under 35 U.S.C. 154(b) by 138 days.

(21) Appl. No.: 10/122,597

(22) Filed: Apr. 15, 2002

(65) Prior Publication Data

US 2002/0174892 A1 Nov. 28, 2002

(30) Foreign Application Priority Data

May 3, 2001 (FI) .............................................. 20010913

(51) Int. Cl.⁷ .............................................. F16K 15/14
(52) U.S. Cl. ...................................... 137/605; 137/853
(58) Field of Search ................................ 137/605, 846, 137/853, 852

(56) References Cited

U.S. PATENT DOCUMENTS

| | | | |
|---|---|---|---|
| 3,416,567 A | * 12/1968 | Von Dardel et al. | 137/605 |
| 4,582,081 A | 4/1986 | Fillman | |
| 5,330,437 A | * 7/1994 | Durman | 137/846 |
| 5,535,770 A | * 7/1996 | Nurmi | 137/14 |
| 5,924,452 A | 7/1999 | Szpara et al. | |
| 6,079,449 A | * 6/2000 | Gerber | 137/859 |
| 6,305,420 B1 | * 10/2001 | Atkinson et al. | 137/846 |

FOREIGN PATENT DOCUMENTS

| | | |
|---|---|---|
| SE | 320240 | 2/1970 |
| WO | WO 99/32816 | 7/1999 |

OTHER PUBLICATIONS

Finnish Search Report, Patent No. 20010913, dated Oct. 25, 2001.

* cited by examiner

*Primary Examiner*—Stephen M. Hepperle
(74) *Attorney, Agent, or Firm*—Marshall, Gerstein & Borun LLP

(57) ABSTRACT

A valve means for a flow pipe includes a cylindrical or sleeve like body part having a length which is longer than the extension of the flow opening in the flow pipe. The body part is fastenable to the flow pipe or to a branch part of the flow pipe by a connecting means, whereby the connecting means comprises a first flange extending in a first direction of the flow pipe and a second flange extending in a direction opposite to the first direction of the flow pipe, said first and second flanges being fastened to the body part. The body part is made of a flexible structure in order to provide for the valve function in a simple manner.

13 Claims, 8 Drawing Sheets

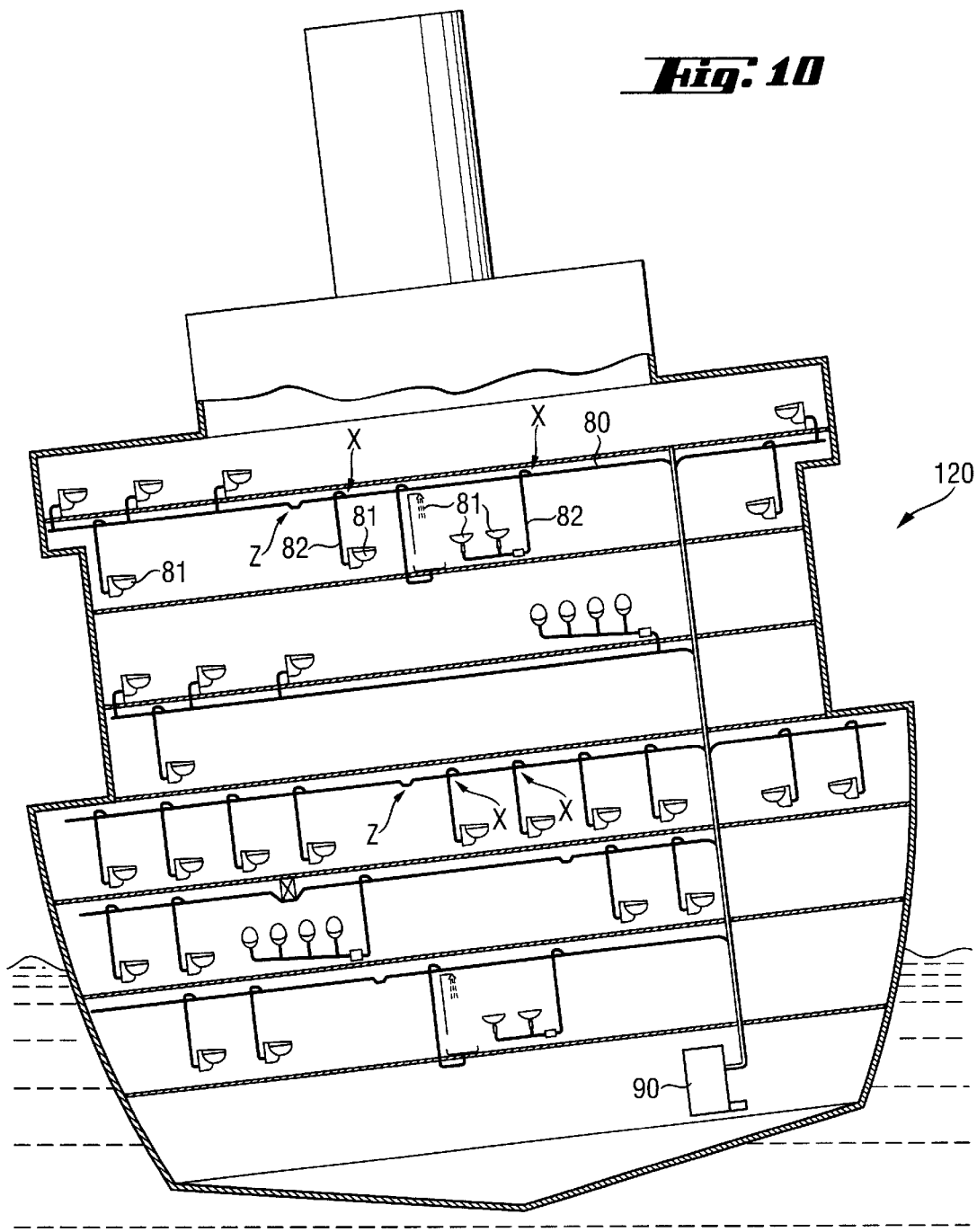

ously made from a
VALVE MEANS

FIELD OF THE INVENTION

The present invention generally relates to valve means for use in a fluid flow pipe.

BACKGROUND OF THE INVENTION

A generally known solution for preventing back flow of a flow from a predetermined flow direction is to install a non-return valve. For example, a secondary flow pipe may be provided near the junction of the secondary flow pipe and a main flow pipe, so that the flow from the secondary flow pipe into the main flow pipe can be prevented from flowing back into the secondary flow pipe. The installation of an additional device in the piping is, however, arduous, requires substantial space, and is expensive.

WO 99/32816 discloses a different approach, in which a valve means is installed in the junction of the main flow pipe and the secondary flow pipe. This known solution comprises a separate valve body with flow pipe connections and a secondary flow pipe connection, whereby the flow opening of the secondary flow pipe is arranged to be closed by a mechanical flap. The known valve means, forming a separate entity, is difficult to install and its function is subject to disturbances and faults due to its complicated structure.

SUMMARY OF THE INVENTION

The object of the invention is to achieve a valve means, by which the above mentioned disadvantages are avoided and which provides for a reliable function by simple means. In accordance with the teachings of the present invention, the actual valve function is achieved in a simple manner provided by the structure or structure material of the valve means.

In accordance with an exemplary embodiment, the valve means comprises a body part, which can be fixed to the flow pipe. The length of the body part in the direction of the flow pipe is longer than the extension or length of the flow opening in the direction of the flow pipe, and the extension of the body part in a radial direction or the peripheral direction of the flow pipe is chosen larger than the extension of the flow opening in the radial direction or the peripheral of the flow pipe, whereby the body part can cover the flow opening.

The body part may be made of a resilient material so that it gives way to the flow from the flow pipe and so that it resumes its original position after the flow, whereby it covers said flow opening, prevents back flow and, depending on the circumstances it is used, does not form a barrier to the flow in the flow pipe.

In order to provide simple structure and installation, the body part may be cylindrical or sleeve like, whereby its outer diameter is substantially equal to the inner diameter of the flow pipe or a branch part of the flow pipe. The body part is advantageously attachable to the flow pipe, or to the branch part, by a connecting means.

The connecting means is advantageously formed of a first flange portion connected to the body part and extending in a first direction of the flow pipe, the inner diameter of which is substantially equal to the outer diameter of the flow pipe, and of a second flange portion extending in a second direction opposite to the first direction of the flow pipe, the inner diameter of which is substantially equal to the outer diameter of the flow pipe. Thus the body part of the valve means and its attaching element (i.e. the first flange portion and the second flange portion) may easily be formed into a unitary structure.

In order to ensure resistance to wear and a secure function, the valve means is advantageously made from a resilient structure that resumes its shape, such as a rubber material or the like. The valve means may also be pre-installed, such as into a separate pipe section connectable to the flow pipe or into a separate pipe junction connectable to a flow pipe and a secondary flow pipe.

The valve means is particularly advantageous when employed in a vacuum sewer system.

BRIEF DESCRIPTION OF THE DRAWINGS

In the following the invention is described more in detail, by way of example only, with reference to the accompanying schematic drawings, in which:

FIG. 10 shows a vacuum sewer system on a vessel.

DETAILED DESCRIPTION

Figure 1:
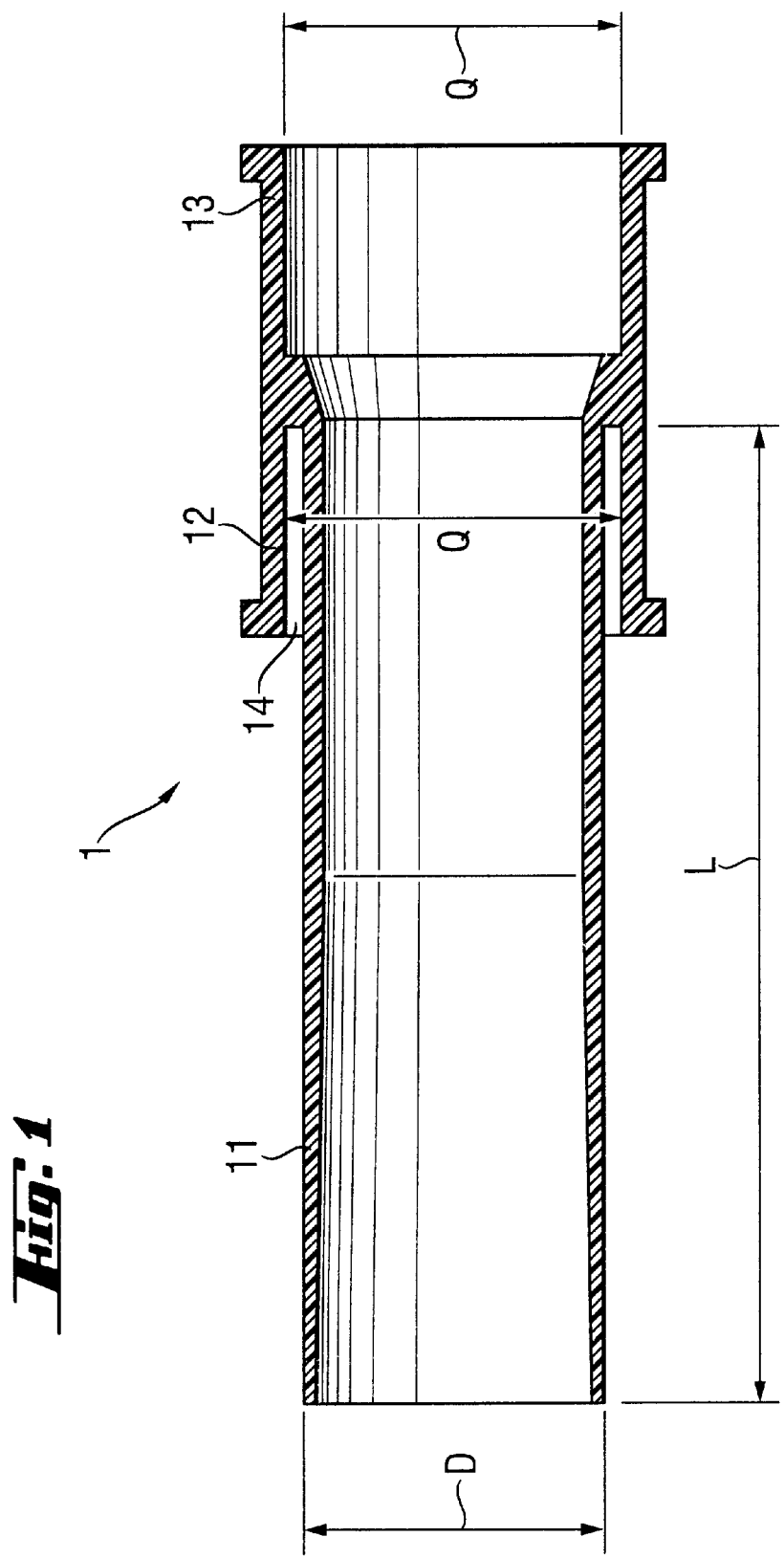
FIG. 1 shows a cross-section of an embodiment of the valve means according to the invention.
Figure 2:
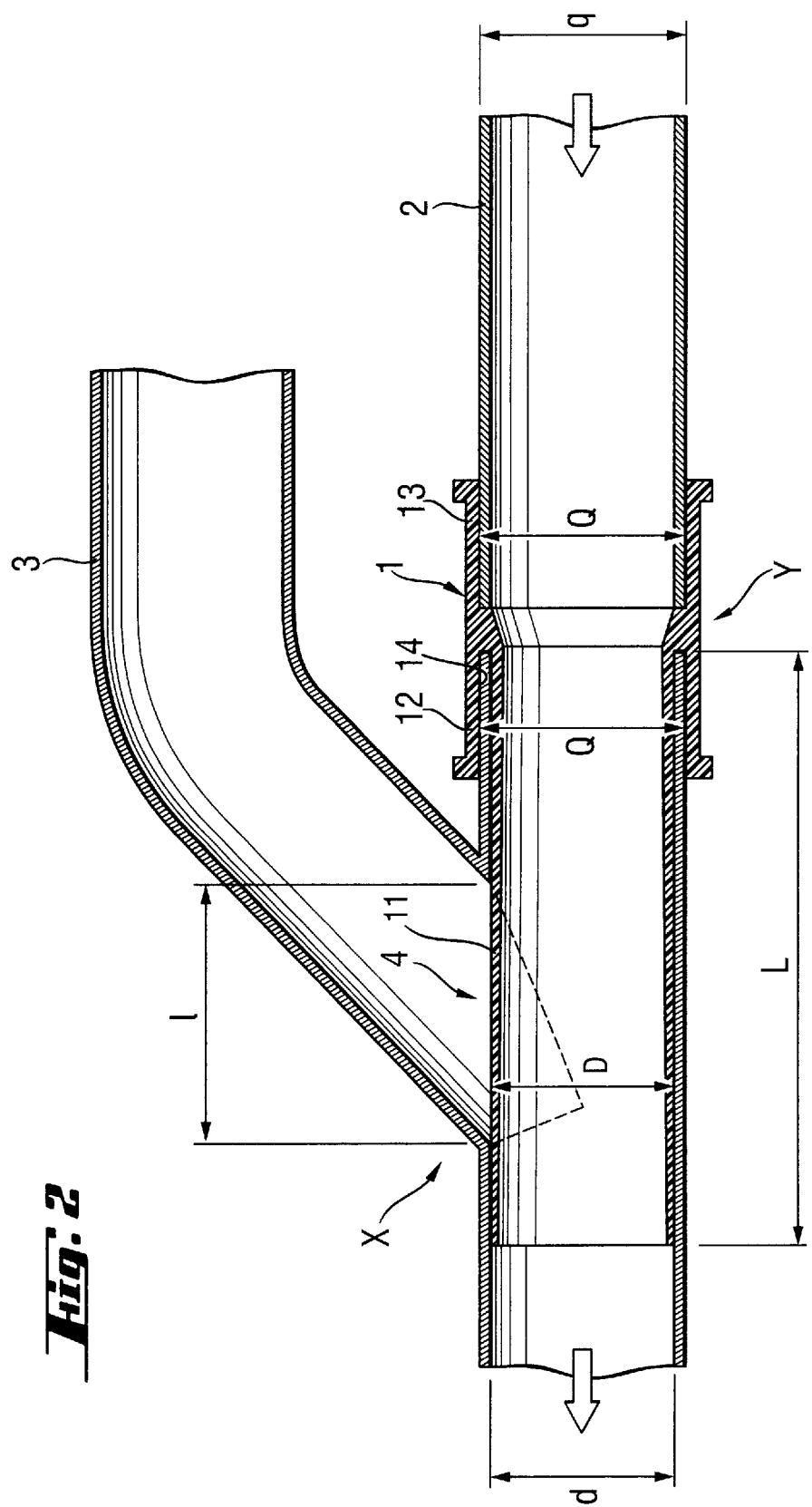
FIGS. 2 and 3 show the valve means according to FIG. 1 installed at a junction of a flow pipe and a secondary flow pipe.
Figure 3:
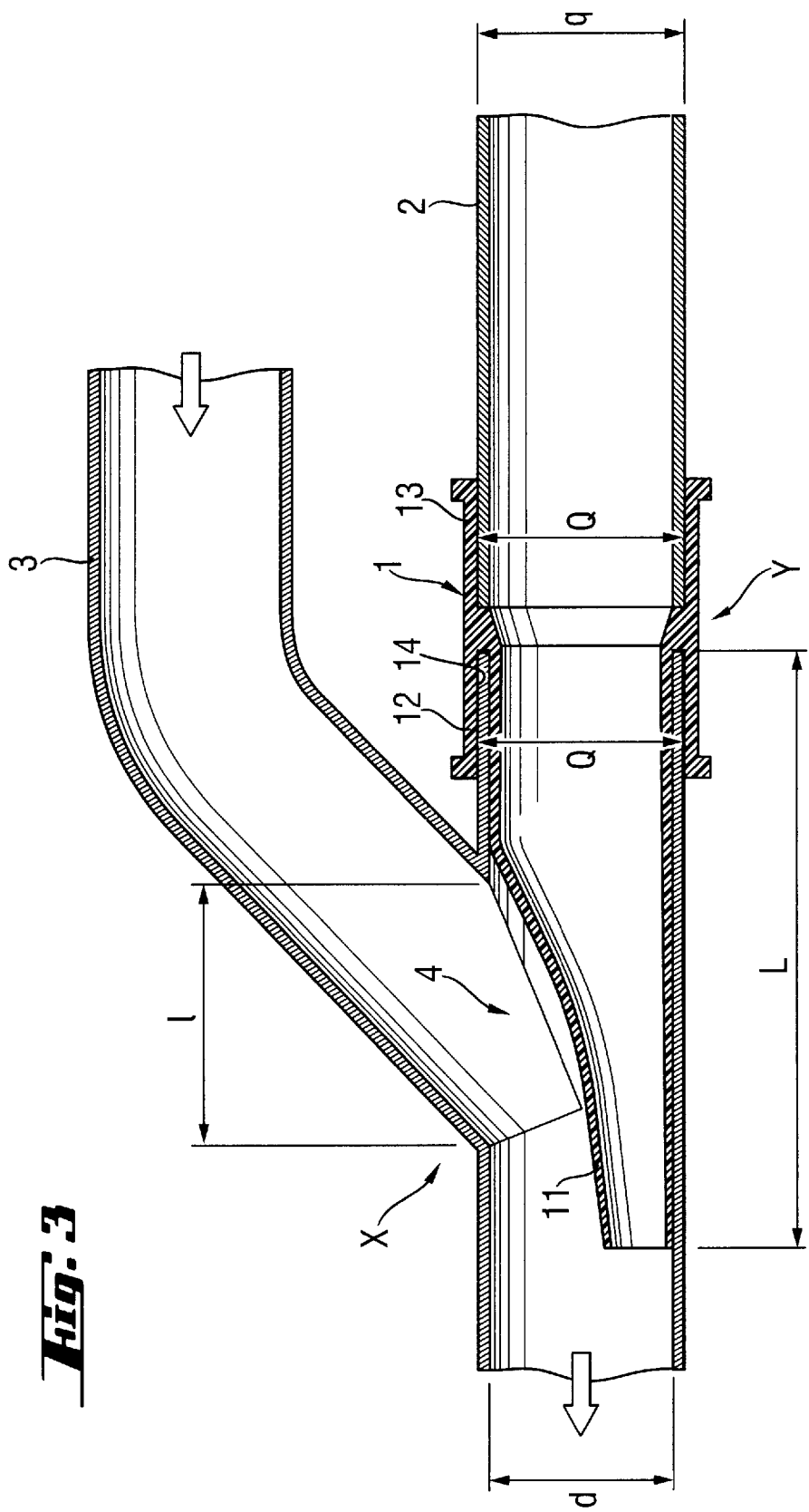
Figure 4:
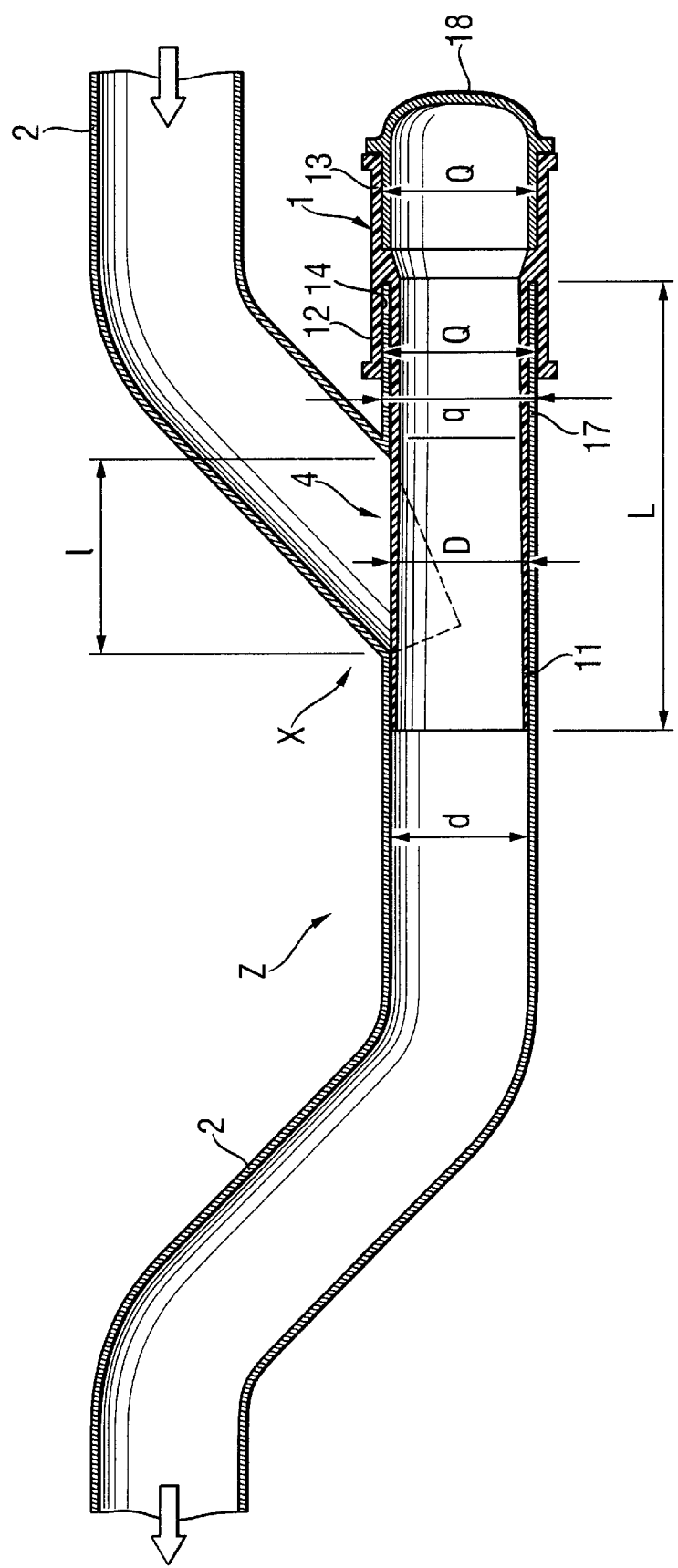
FIGS. 4, 5, 6, and 7 show the valve means according to FIG. 1 installed in a so-called flow pocket of a flow pipe.

In FIGS. 1, 2, and 3 the valve means is generally indicated by reference numeral 1. The valve means 1 is installed at a junction X of a main flow pipe 2 and a secondary flow pipe 3 which thus forms a predetermined flow point. The valve means 1 is intended for the prevention of back flow of a flow from a predetermined flow direction through a flow opening 4 at said predetermined flow point X in the flow pipe.

The valve means 1 comprises a body part 11 having a length L in the direction of the flow pipe 2 longer than the extension or the length 1 of the flow opening 4 in the direction of the flow pipe at the junction of the flow pipe 2 and the secondary flow pipe 3. In order for the body part 11 to cover said flow opening 4, also the extension of the body part in the radial direction or the peripheral direction of the main flow pipe 2 also has to be larger than the extension of the flow opening 4 in the radial direction or the peripheral direction of the main flow pipe 2. These conditions should also be met in an arrangement where a number of secondary flow pipes lead to or are connected to the main flow pipe.

The body part 11 is arranged to settle in a first position against the inner surface of the flow pipe 2 and to cover the flow opening 4. The body part 11 may be formed of a resilient structure that resumes its shape, whereby a flow from the secondary flow pipe 3 (i.e. a flow from a predetermined direction) can flow into the flow pipe 2, but back flow into the secondary flow pipe is prevented after the flow has terminated.

In operation, when the medium flow runs from the secondary flow pipe 3 into the flow pipe 2, the body part 11 gives way from a first position (FIG. 2), in which it is positioned against the flow opening 4 and covers the flow opening 4, and moves to a second position (FIG. 3), in which the body part 11 diverges from the flow opening 4 to open a free passage for the medium flow (shown by arrows in FIG. 3). When the medium flow ceases, the resilient body part 11 returns to its first position and closes said flow opening 4. An advantageous resilient structure is achieved by forming the body part 11 of rubber or a comparable material.

A connecting means, such as a first flange portion 12 extending in the direction of flow pipe 2 and a second flange portion 13 extending in the opposite direction, is attached to one end of the body part 11. Accordingly, the first flange portion 12 is in the direction of the body part 11 and the second flange portion 13 is of an opposite direction with regard to the first flange portion 12. The outer diameter D of the cylindrical body part 11 is substantially equal to the inner diameter d of the flow pipe 2, whereby it settles tightly against the inner surface of the flow pipe. The inner diameters Q of the first flange portion 12 and the second flange portion 13 are substantially equal to the outer diameter q of the flow pipe.

Figure 5:
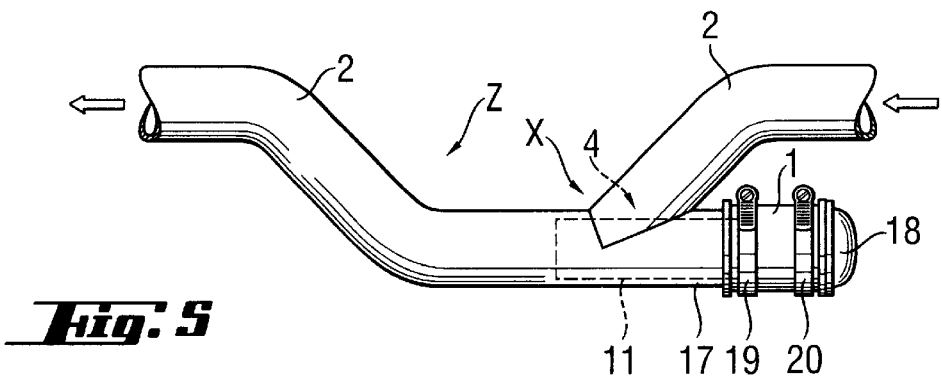
Figure 6:
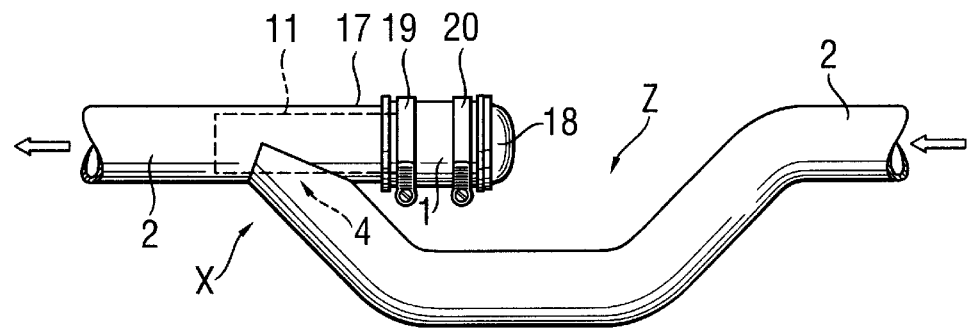
Figure 7:
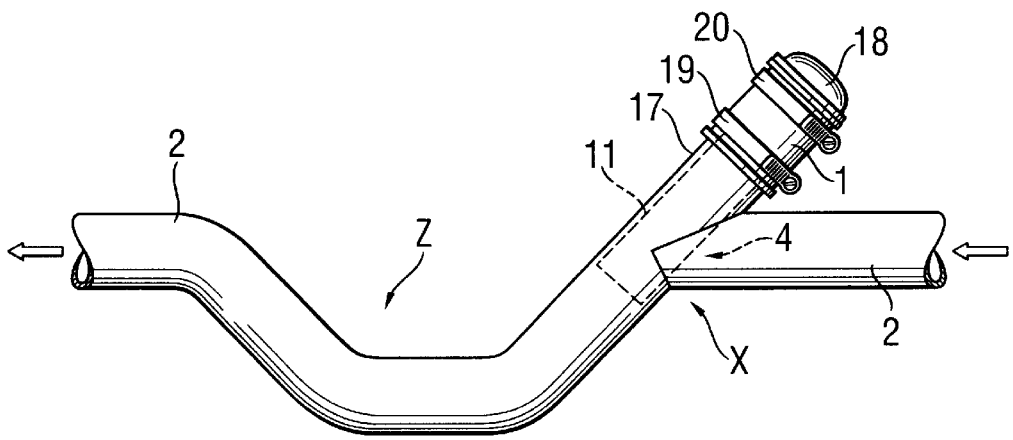

The illustrated structure of the valve means 1 provides for a particularly advantageous installation. The flow pipe 2 may be cut off at a point Y near the junction X of the flow pipe 2 and the secondary flow pipe 3. The cylindrical body part 11 of the valve means 1 is inserted at the secondary flow pipe 3 end of the flow pipe 2, whereby the flow pipe 2 settles in the gap or slot 14 between the body part 11 and the first flange portion 12. The gap or slot 14 is advantageously dimensioned so that it forms a tight fit around the end of the flow pipe 2. The cutting point Y and the length L of the body part 11 are chosen so that the body part 11 extends over the flow opening 4, as shown in FIGS. 2 and 3. After this the other end of the flow pipe 2 is inserted into the second flange portion 13 of the body part, whereby a tight connection provided with a valve is ready. This is a very advantageous solution both in view of installation work and structural costs, particularly in retrofitting, in comparison to prior art. The installation may, when necessary, be provided with one or more pipe clamps as described below in connection with FIGS. 5, 6, and 7.

The valve means 10 may have a unitary body part and flange portions formed of rubber material, as illustrated in FIGS. 1–3. The material selected for the structure has suitable flexibility and resiliency so that it may give way and yet return to its original shape. The dimensioning of the valve means is chosen so that tight connections with the flow pipe are achieved.

The valve means discussed in connection with FIGS. 1, 2, and 3 may also be preinstalled into a separate pipe section which is fastened at a suitable location in the flow pipe. The valve means may also be preinstalled into a separate pipe connection attached to a flow pipe and a secondary flow pipe. Furthermore, the valve means according to the invention may also be successfully employed in an arrangement where a number of secondary flow pipes lead to or are connected to a main flow pipe.

In FIGS. 4, 5, 6, and 7, the valve means 1 according to FIG. 1 is shown employed in different operational situations. The valve means 1 corresponds in way of structural and dimensional principles to the valve means according to FIG. 1, and therefore it is not described more in detail in this connection. Such operational situations may be typical in vacuum sewer systems, for example.

In vacuum systems, it is advantageous to provide non-return valves at spaced locations along the vacuum pipe, the non-return valves preventing back flow in long horizontal lines. The vacuum sewer system on a vessel (FIG. 10) is a typical example, in which the movement of the vessel and the so-called trim often cause back flow in the piping.

In vacuum piping it is also necessary to have flow pockets (also known as pipe or transport pockets) Z (FIGS. 8 and 10) which make the transport of medium in lengthy piping more efficient. Furthermore, access to intermediate portions of the piping are desirable in the event of blockage or other maintenance considerations. Access points are typically formed by providing a branch with one end being openable for cleaning measures. Also in this connection, the valve means according to the invention functions as a non-return valve, whereby the purpose however is to prevent back flow in the actual flow pipe.

When the flow runs in the direction shown by arrows in FIGS. 4–7, the valve means 1 gives way and moves from a first position closing the flow opening 4 to a second position opening the flow opening 4. When the flow ceases, the valve means 1 returns to the first position and closes the flow opening 4, which prevents a possible back flow in the flow pipe 2 in a direction opposite to the direction shown by arrows. In these examples, a branch pipe 17 is formed at a flow pocket Z in the flow pipe 2. The first flange portion 12 of the valve means 1 is inserted in the end of the branch pipe 17 and a cup formed closure means 18 is inserted into the second flange portion 13 of the valve means 1. The flange portions 12 and 13 are fastened by pipe clamps 19 and 20 to the branch pipe 17 of the flow pipe 1 and to the closure means 18 to secure the sealing of the installation.

Also in this connection the valve means according to the teachings of the present invention is usable in an advantageous way without supplementary special parts and particularly so that the functions of three means, i.e. a non-return valve, a maintenance opening and a so-called flow pocket may be achieved by only one valve means according to the invention.

Figure 8:
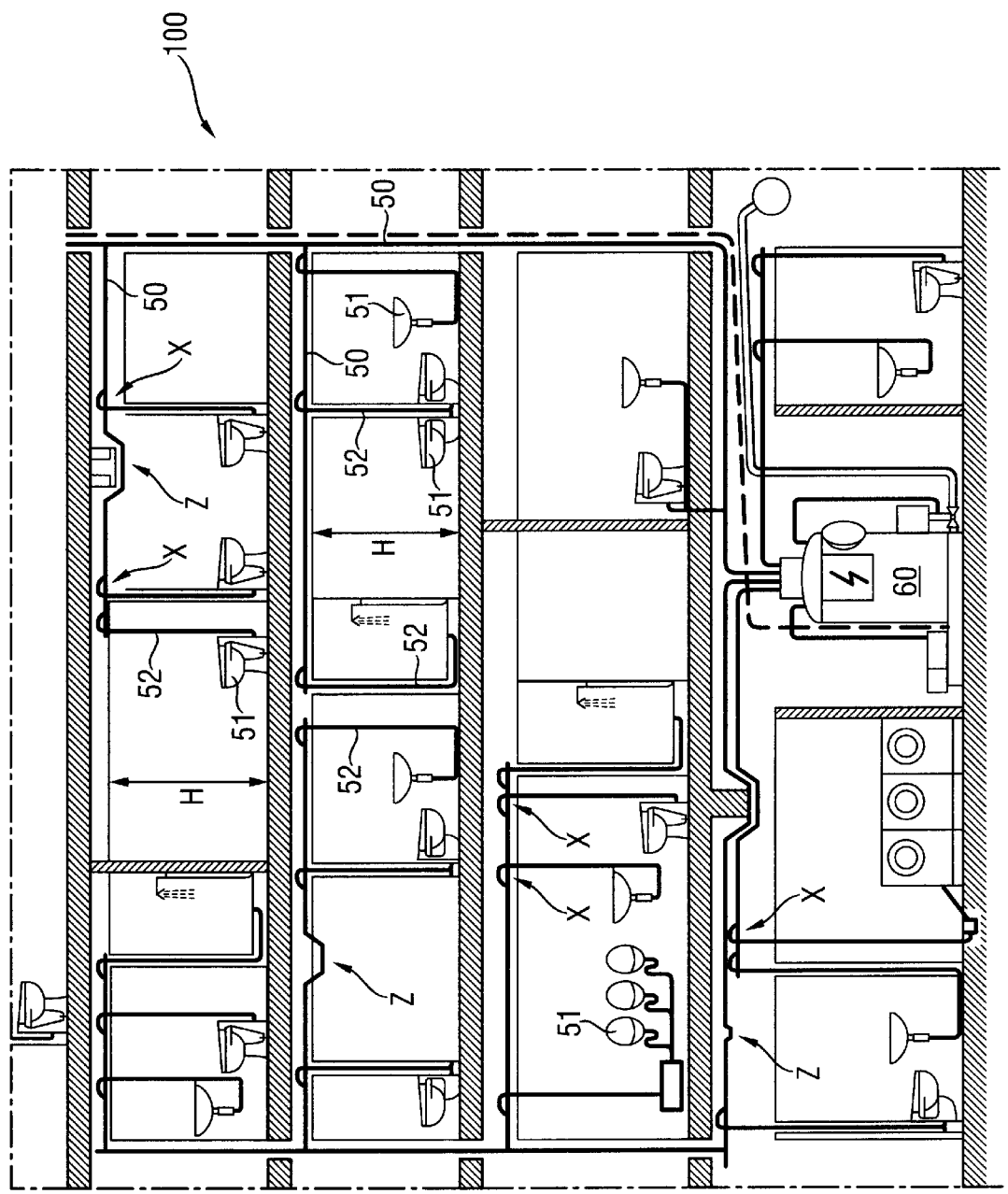
FIG. 8 shows a vacuum sewer system in a building.

The valve means may be advantageously incorporated into a vacuum sewer system used in a building 100, as shown in FIG. 8. Reference numeral 50 indicates a main line under partial vacuum, i.e. corresponding to the flow pipe described above. The main line is connected to a vacuum central 60, and the vacuum sewer system comprises a number of sources 51 of waste (e.g. a toilet, a urinal, a wash basin, etc.). Each waste source 51 is connected to a branch pipe 52, which usually has a riser portion H with a height of approximately 2 to 2.5 m, and which is connected to the main line 50. From the waste source 51 the waste travels in the form of a slug in the direction of the vacuum central 60 due to a lower pressure in front of the slug than behind the slug.

It has however shown that in system with a number of waste sources and correspondingly with a number of junctions X in the main line with the branch lines, which correspond to the above mentioned junctions of a secondary flow pipe and a flow pipe, waste flow back to the branch pipes from the main line may occur during a pressure equalization stage. Previously, in order to prevent back flow, non-return valves have been installed in the branch pipes near the junction of each branch pipe and the main line. The valve means described herein provides several advantages over this conventional approach with regard to installation and costs as well as to the function of the vacuum sewer system.

Flow pockets Z, as discussed above, are also used in such a main line for enhancing the transport of waste. In connection with these, valve means in accordance with the teachings of the present invention may be employed as disclosed in connection with FIGS. 4, 5, 6, and 7.

Figure 9:
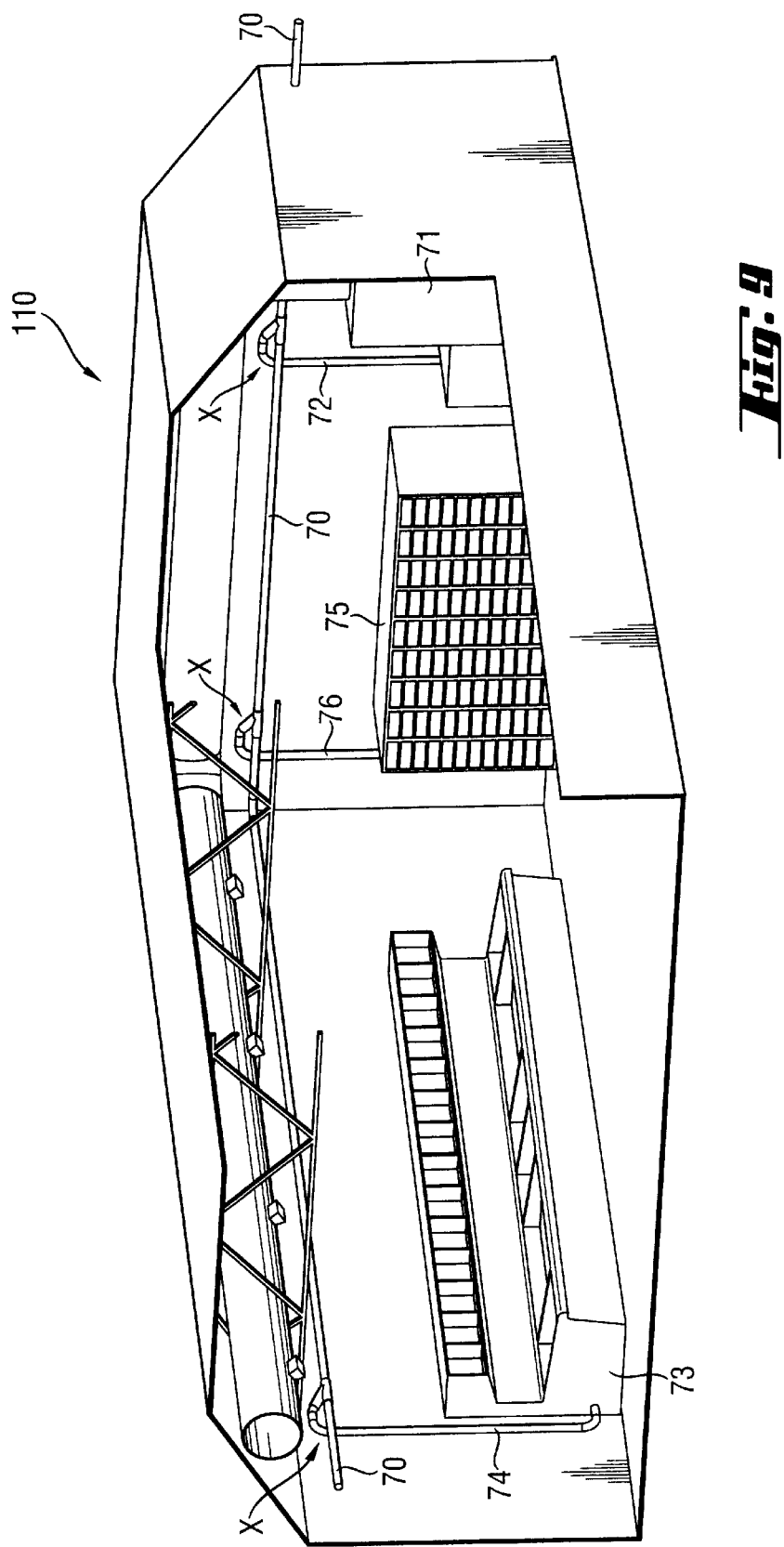
FIG. 9 shows a vacuum sewer system for collecting condensate.

FIG. 9 illustrates another application for the flow means. Vacuum sewer systems 110 are also used in connection with air-conditioning systems 71, freezers 73, and freezer lockers 75 to transport condensate. The condensate is transported by way of vacuum through branch pipes, indicated by reference numerals 72, 74, and 76, to the main line 70 of the system by the same principle as in connection with the application of FIG. 8. Also in this connection, the installation of a valve means at the junction X of the branch pipes 72, 74, and 76 and the main line, as well as in connection with possibly used flow pockets, provides substantial advantages. The main line 70 is usually connected to a vacuum central (not shown).

In FIG. 10 is shown a vacuum sewer system 120 employed in a vessel. The vacuum sewer system aboard a vessel usually comprises, according to FIG. 10, a number of waste sources 81, branch pipes 82 connected to the same, a main line 80, and a vacuum central 90. In a vessel application the back flow in the actual flow pipe, i.e. in the main line 80, usually constitutes a bigger problem than in other circumstances due to the movements of the vessel at sea and the trimming of the movement of the vessel. The use of valve means in accordance with the teachings of the present invention in the manner disclosed in connection with FIGS. 4, 5, 6, and 7 at the junctions X of the branch pipes and the main line and the flow pockets Z in the main line have shown to be particularly advantageous.

The above description with the accompanying drawings is only intended to clarify the basic idea of the invention. The details of the invention, such as the material and the fastening of the valve means, etc. may vary within the scope of the ensuing claims.

What is claimed is:

1. A valve means for a flow pipe having a flow opening, the valve means comprising:
    a body part formed of a resilient material having a length which is longer than a length of an extension of the flow opening in the flow pipe, the body part having an outer diameter substantially equal to an inner diameter of the flow pipe; and
    a connecting means attached to one end of the body part and fastenable to the flow pipe, the connecting means including a first flange extending in a first direction of the body part and a second flange extending in a second direction opposite to the first direction, the first and second flanges each having an inner diameter substantially equal to the outer diameter of the flow pipe;
    wherein the first and second flanges are fastened to the body part.

2. The valve means of claim 1, in which the body part, the first flange, and the second flange form a unitary structure.

3. The valve means of claim 1, in which the body part has a normal shape and a deflected shape, and in which the body part resilient material biases the body part toward the normal shape.

4. The valve means of claim 1, in which the body part is formed of rubber.

5. The valve means of claim 1, in which the valve means is arranged in a separate pipe section connectable to the flow pipe.

6. The valve means of claim 1, in which the valve means is arranged in a pipe connection connectable to the flow pipe and a secondary flow pipe.

7. The valve means of claim 1, in which the valve means is employed in a vacuum sewer system.

8. The valve means of claim 1, in which the flow pipe comprises a main flow pipe and a secondary flow pipe, and in which the body part connecting means is fastened to the main flow pipe.

9. The valve means of claim 1, in which the flow pipe comprises a main flow pipe and a secondary flow pipe, and in which the body part connecting means is fastened to the secondary flow pipe.

10. A valve for use at a junction of a main flow pipe and a secondary flow pipe, the junction defining a flow opening, the valve comprising:
    first and second flanges adapted to engage one of a flow pipe selected from the group of flow pipes comprising the main flow pipe and secondary flow pipe, each of the first and second flanges having an inner diameter substantially equal to the outer diameter of the selected flow pipe; and
    a body part supported by the first and second flanges and having a length sufficient to extend past the flow opening and an outer diameter substantially equal to an inner diameter of the selected flow pipe, the body part having a normal position, in which the body part closes off the flow opening, and a deflected position, in which fluid flow is allowed through the flow opening, wherein the body part is formed of a resilient material which biases the body part toward the normal position.

11. The valve means of claim 10, in which the body part, the first flange, and the second flange form a unitary structure.

12. The valve means of claim 10, in which the body part is formed of rubber.

13. A valve means for a flow pipe having a flow opening, the valve means comprising:
    a body part having a length which is longer than a length of an extension of the flow opening in the flow pipe; and
    body part having a connecting means fastenable to the flow pipe, the connecting means including a first flange extending in a first direction and a second flange extending in a second direction opposite to the first direction, wherein the first and second flanges are fastened to the body part;
    wherein the valve means is employed in a vacuum sewer system.

* * * * *